(12) United States Patent
Rambacher et al.

(10) Patent No.: US 7,383,430 B1
(45) Date of Patent: Jun. 3, 2008

(54) SYSTEM AND METHOD FOR VALIDATING RESOURCE GROUPS

(75) Inventors: Mark Rambacher, Littleton, MA (US); Richard Urmston, Westborough, MA (US); Deepak Narain, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 345 days.

(21) Appl. No.: 10/918,161

(22) Filed: Aug. 13, 2004

Related U.S. Application Data (60) Provisional application No. 60/592,064, filed on Jul. 29, 2004.

(51) Int. Cl.
*G06F 9/00* (2006.01)
*G06F 15/177* (2006.01)
*G06F 9/24* (2006.01)

(52) U.S. Cl. .................... 713/1; 713/2; 713/100
(58) Field of Classification Search ............... 713/1, 713/2, 100
See application file for complete search history.

(56) References Cited

U.S. PATENT DOCUMENTS

| | | | | |
|---|---|---|---|---|
| 6,038,677 | A * | 3/2000 | Lawlor et al. | 714/4 |
| 6,438,705 | B1 * | 8/2002 | Chao et al. | 714/4 |
| 6,496,840 | B1 * | 12/2002 | Uceda-Sosa et al. | 707/204 |
| 6,973,500 | B1 * | 12/2005 | Yamamoto et al. | 709/229 |
| 6,996,614 | B2 * | 2/2006 | Hallinan et al. | 709/226 |
| 7,020,695 | B1 * | 3/2006 | Kundu et al. | 709/223 |
| 2004/0093815 | A1 * | 5/2004 | Cordts | 52/232 |
| 2005/0044226 | A1 * | 2/2005 | McDermott et al. | 709/226 |
| 2005/0055694 | A1 * | 3/2005 | Lee | 718/100 |
| 2006/0059323 | A1 * | 3/2006 | Rao | 711/170 |
| 2006/0179106 | A1 * | 8/2006 | Turner et al. | 709/201 |

OTHER PUBLICATIONS

U.S. Appl. No. 10/918,012, filed Aug. 13, 2004, Rambacher et al.
U.S. Appl. No. 10/917,718, filed Aug. 13, 2004, Rambacher et al.
U.S. Appl. No. 10/918,805, filed Aug. 13, 2004, Rambacher et al.
U.S. Appl. No. 10/917,669, filed Aug. 13, 2004, Rambacher et al.
U.S. Appl. No. 10/917,652, filed Aug. 13, 2004, Rambacher et al.
U.S. Appl. No. 10/917,879, filed Aug. 13, 2004, Rambacher et al.
U.S. Appl. No. 10/918,578, filed Aug. 13, 2004, Rambacher et al.

* cited by examiner

*Primary Examiner*—Chun Cao
*Assistant Examiner*—Ji H Bae
(74) *Attorney, Agent, or Firm*—Wolf, Greenfield & Sacks, P.C.

(57) ABSTRACT

A system and method is provided for managing resource groups in a computer system having an automatic availability capability. In one embodiment, a method is provided which may be performed in a computer system comprising a plurality of resources, a monitor for monitoring at least some of the plurality of resources, and an agent to configure resource groups, each resource group specifying a group of resources to be monitored by the monitor. The method comprises: (A) receiving a request from a requestor, at the agent, to configure at least one requested resource group; and (B) determining whether at least one characteristic of the at least one requested resource group is valid.

39 Claims, 8 Drawing Sheets

SYSTEM AND METHOD FOR VALIDATING RESOURCE GROUPS

This application claims priority under 35 U.S.C. § 119(e) to U.S. Provisional Application Ser. No. 60/592,064, entitled "SYSTEM AND METHOD FOR MANAGING RESOURCE GROUPS," filed on Jul. 29, 2004, which is incorporated herein by reference in its entirety.

FIELD OF THE INVENTION

The present invention relates to managing resource groups in a computer system having an automatic availability capability.

BACKGROUND

With some computer systems, the operation of the system is largely transparent to the end user. For example, employees of a company or customers of a business may be provided with various applications and/or services, and/or access to data or a network, without being aware of the location from which these services are being provided, or details about the implementation of the computer system. A system administrator may, for example, establish the services available to an end user on one or more servers interconnected via a network. This "enterprise system" model allows the administrator to centralize the installation of applications, customization of the system, establishment of access permissions, and general operation of the system to ensure that desired services are available to the end users.

An enterprise system may be, for example, a collection of one or more devices interconnected via a computer network to perform a desired function or to carry out various operations of any organization, such as a business organization. An enterprise system may vary widely in scale, such that a single computer or thousands of devices widely distributed over multiple locations may constitute an enterprise system. An enterprise system may provide various services to its end users or clients over a local area network (LAN), wide area network (WAN), wireless network, other network, other types of communication media, or a combination thereof.

An enterprise system is considered "available" when an end user perceives that applications and services are running and operating correctly. High availability may be important to many enterprise systems, such as systems which support electronic commerce (e-commerce) or other types of systems that users expect to be substantially functional on a continuous basis.

BRIEF DESCRIPTION OF DRAWINGS

In the drawings, in which like reference numerals represent like elements.

DETAILED DESCRIPTION

Embodiments of the invention are directed to monitoring resource groups in a computer system.

To increase availability, multiple servers on which applications and/or services execute may be interconnected in a cluster to provide, inter alia, redundant service. That is, when one of the servers malfunctions, another server may take over and provide any of the various services provided by the failed server to the end user. In this manner, important data, services and/or functionality can be distributed over a network such that if one location (e.g., a primary site or server) malfunctions or otherwise becomes unavailable, the functionality and/or services may be transitioned to another location (e.g., a secondary site or server). To ensure that the transition of service from one server to another is substantially transparent to the user and to prevent the loss of data, it may be desirable to periodically or continuously replicate data across the network, such as by data mirroring or active replication. However, as the number of servers and/or services provided by an enterprise system increases, data replication and other administration of the system may become complicated, making high availability difficult for an administrator to sustain. Moreover, an administrator may not always be immediately available to remedy problems, and some problems may be difficult for an administrator to diagnose and/or correct.

Automatic availability (AA) software has been employed to reduce availability interruptions that may be costly to an organization via lost business, lost productivity or lost data. For example, various automated availability products are available, such as the Automated Availability Manager from Legato Software, a division of EMC Corporation of Hopkinton, Massachusetts. In general, AA products provide capabilities to manage system performance and automate failure recovery, data mirroring and replication, and other functions.

Figure 1:
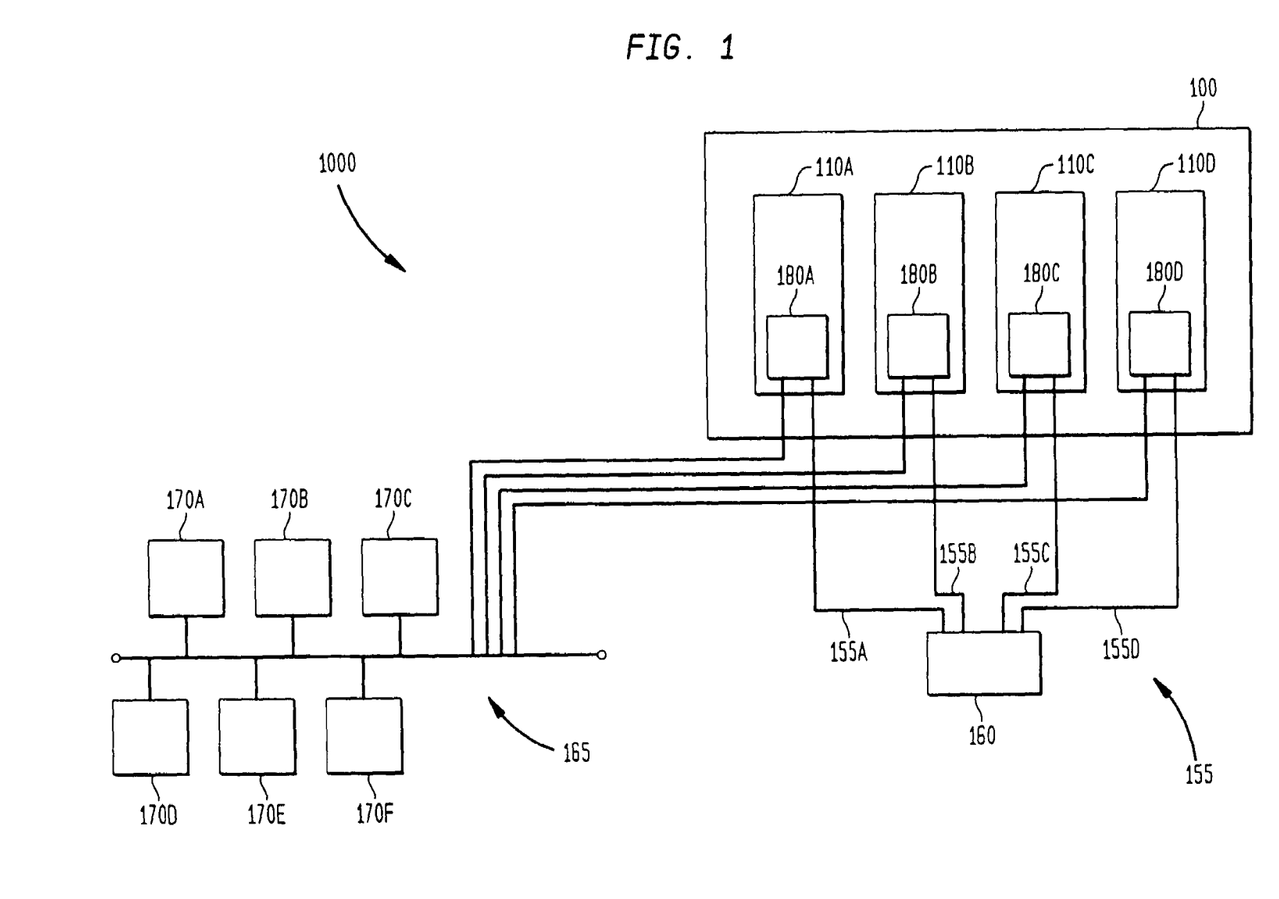
FIG. 1 is a block diagram showing an exemplary system on which automated availability software may be implemented.

FIG. 1 illustrates an exemplary system 1000 on which an AA product may be deployed. System 1000 includes a cluster 100 having a plurality of nodes (e.g., servers) 110A-110D interconnected over a network 155. Network 155 may be any type of network that permits communication between the servers. In the embodiment illustrated in FIG. 1, network 155 is a dedicated network. That is, hub 160 handles only communications between the servers 110 in the cluster 100 via network connections 155A-155D. Alternatively, network 155 may be part of a larger network that includes any of various clients or end users, network devices, etc.

System 1000 also includes network 165, which may include a LAN, WAN, the Internet, other network, or combination thereof. Network 165 provides connectivity between several end users 170 and servers 110 to facilitate end user access to cluster 100. An end user may include, for example, a client computer or other device having network-based access to one or more server resources. Networks 155 and 165 may, for example, form a single network, may be connected through a portal or gateway to each other, and may be connected to one or more additional networks. In this respect, it should be appreciated that system 1000 may be implemented on any number of different network types, topologies and configurations which permit multiple servers to communicate with each other and allow one or more end users to access various server resources.

To any of end users 170, cluster 100 may be perceived as a single resource. For example, cluster 100 may provide access to any number of applications, such as a word processing application, an electronic mail (e-mail) service, database resource(s), or other application. Cluster 100 may implement any of numerous services or functions, such as an online banking service, a website permitting the electronic purchase of merchandise, a company intranet, or another service or function.

An administrator may be responsible for maintaining the availability of the resources provided by cluster 100 to end users 170, for removing and/or adding resources to the cluster, and in general for ensuring that the cluster is operational and available. AA software may be installed to aid in these tasks. For example, an automatic availability manager (AAM) 180 may be installed on cluster 100 to aid in monitoring any of the various resources provided by the cluster. In FIG. 1, the AAM is distributed across the nodes in the cluster, such that an agent 180A-180D of the AAM is installed on each node, but other configurations are possible. AAM 180 may, for example, include software instructions encoded in a memory or other type of computer readable medium available to the cluster, and may be executed on one or more processors available to the cluster (e.g., a processor resident on one or more nodes in the cluster). In this respect, AAM 180 may be installed on one or more of nodes 1 10 on the cluster 100, and may be capable of performing any number of functions related to monitoring, ensuring availability, and diagnosing or correcting problems in the cluster.

AAM 180 may, for example, provide functionality which enables any number of the resources provided by cluster 100 to be monitored or controlled. AA software generally provides functionality for monitoring or controlling a collection of resources in a "resource group." A resource group generally refers to a group of one or more resources to be monitored, and the "infrastructure" (e.g., one or more data structures, commands, parameters and/or attributes) which enable the resource(s) to be monitored and/or controlled by the AA software. Typically, a resource group is established to monitor one or more resources when the resources are installed. A resource group may define any attribute related to monitoring and/or controlling the resource(s). For example, a resource group created to monitor a database application may include procedures for starting and/or shutting down the application, commands for responding to diagnostic information produced by the application during its operation, and information identifying failover hardware to host the application program in the event that the device on which the application is executing fails.

A resource monitored by AA software may be any entity that may be monitored and/or controlled, such as a service, application process, system path or other logical address, IP address, node (e.g., a storage device or server), network information card (NIC), network device (e.g., a router or bridge), computer alias (e.g., a NETBEUI or NETBIOS identifier), database or any other entity suitable for monitoring or control.

A resource group may be configured to take any of numerous actions automatically upon the occurrence of a predetermined event. In one example, a resource group created for monitoring a database application may be configured to automatically respond to information provided by the application, such as by sending an email to an administrator when the application's transaction rate reaches a particular threshold. In another example, a resource group may receive an administrator's command to start the database application, and may execute a series of detailed steps in response to the command to ensure that the database application is initiated properly.

Conventionally, a resource group is set up by an administrator who provides information to AA software on the resource(s) to be monitored. A conventional system employs one or more modules which enable the administrator to provide the information necessary to establish a resource group, with each module being customized for a particular type of resource to be monitored. Specifically, a conventional module defines functionality, typically provided in the form of one or more scripts, for presenting a series of prompts to an administrator to collect information necessary to create a resource group for a particular type of resource. For example, a module corresponding to a database application may define a script which prompts the administrator for, inter alia, the IP address of the node on which the application executes and/or the storage device(s) on which data managed by the application resides. Upon receiving the information, the software may employ it to make insertions into a data structure, such as a text file, which may then be employed by a procedure provided by the AA software to create the resource group that monitors the resource.

Applicants have appreciated that conventional approaches for configuring and monitoring a resource group suffer from several drawbacks.

First, once a procedure is executed which creates a resource group, the resource group can not be modified or deleted using conventional techniques. Thus, for example, if an already-established resource group monitors a service (e.g., an e-mail service) which includes one or more databases, and a new database is desired to be added to the service and the resource group, the resource group may not be modified to monitor the new database. In addition, if an administrator makes a mistake in providing the information to create a resource group, the resource group may not be modified to correct the error. This is because once the procedure to create the resource group is executed, a variety of entities (e.g., routines, parameters and/or data structures) implementing the resource group are created, but the collection of those entities is not identified to the administrator, and there is no identifiable entity to communicate with to make the desired modification. Even re-executing the procedure creates a new resource group, rather than replacing the one which had already been created.

Second, to configure a resource group in a conventional system, an administrator is required to log on to each node on which a resource to be included in the resource group resides. Thus, if a resource group is to include resources which reside on four different nodes, the administrator is required to log on to each of the four nodes. Applicants have appreciated that the ability to create a resource group without having to log on to each node may provide administrative flexibility.

Third, conventional systems require an administrator to manually input information to identify resources which are to be monitored. This introduces the possibility that errors may be made in identifying a resource. Applicants have appreciated that such errors can be minimized by automatically detecting the resources that are possible for inclusion in a resource group and presenting those possibilities to the administrator for selection, so that the administrator need not manually identify the resources.

Similarly, Applicants have further appreciated that some resources (and/or characteristics thereof) to be included in a resource group may be determined in an automated fashion, so that no input at all need be provided by the administrator to specify such resources and/or characteristics.

Fourth, conventional resource groups that include a resource which is installed on more than one node require that the resource be configured in the same manner on each of the nodes. For example, resource groups that include an instance of a database application executing on more than one node require that the application be installed at the same path on each node. Applicants have appreciated that flexibility with regard to resource configuration on different nodes may be advantageous so that, for example, the configuration may make the best use of each node's available resources.

Fifth, conventional systems do not perform any validation on the parameters, attributes and other entities specified for a resource group. Thus, if an error is made in specifying an invalid resource group, the error is not discovered until the system attempts to invoke the invalidly specified resource group. For example, if a resource group specified a non-existent device as one to which a resource (e.g., a database application) should be moved in the event of a failure, this would not be determined until a failure of the primary resource occurred, and a transition to the non-existent device was attempted. As a result, conventional resource groups may ineffectively define the actions that should occur upon the failure of a resource and/or may not monitor the resource as desired by an administrator. Applicants have appreciated that the ability to validate a resource group at creation may be desirable.

Sixth, conventional systems do not provide a user interface for creating resource groups which has a display that may be customized depending on the resources residing on the system. Applicants have appreciated that a user interface with this capability may provide numerous advantages over conventional systems, such as flexibility with respect to the development and maintenance of the user interface.

Seventh, conventional systems do not provide a user interface for monitoring one or more resource groups which has a display that may be customized depending on the resources residing on the system. Applicants have appreciated that a user interface with this capability may also provide numerous advantages over conventional systems, such as the ability to monitor more than one resource group at a time, and/or the ability to view information which is specific to each resource group being monitored.

According to various embodiments of the invention, techniques are provided which may be employed by a user (e.g., an administrator) to create, maintain and administer one or more resource groups.

In one embodiment, a tool is provided for creating a resource group which may automatically discover one or more resources, or characteristics thereof, which are to be included in the resource group. As a result, the user need not manually specify the automatically discovered resources(s) or characteristic(s). The tool may be configured to determine particular resources and/or characteristics without the user's input, and/or based in part on user input.

In another embodiment, an administrator need not log on to each node on which a resource to be included in a resource group resides in order to create the resource group.

In yet another embodiment, a resource group can be formed including at least one type of resource executing on multiple computers or nodes, wherein the resource is configured differently on at least two of the nodes. This provides for flexibility with respect to the configuration of resources on different nodes.

In a further embodiment, one or more resources or characteristics thereof requested for inclusion in a resource group are checked at creation time to determine their validity. Validation ensures that an invalid resource or characteristic specified by a user is not incorporated into a resource group, and that the error is detected at creation time for the resource group so that it can be remedied.

In another embodiment, a technique is provided for enabling modification and/or deletion of an existing resource group. For example, a record of acts performed to create the resource group may be maintained, such as the entities that are created to collectively comprise the resource group. As a result, a user may modify or delete any or all of these entities to modify or delete the resource group after its creation.

In yet another embodiment, a GUI is provided for creating resource groups which has a display that is customized depending on the resources installed on the system. For example, the GUI may recognize that new resources have been installed on the system, and present a display which adapts depending on the presence of those resources.

In still another embodiment, a GUI is provided for monitoring resource groups which has a display that is customized according to the resources residing on the system. The GUI may include more than one display portion, so that each display portion may present information related to monitoring a specific resource group. As a result, an administrator may view information related to monitoring more than one resource at a time, and may view information which is specific to each resource group being monitored in each display portion.

Figure 2:
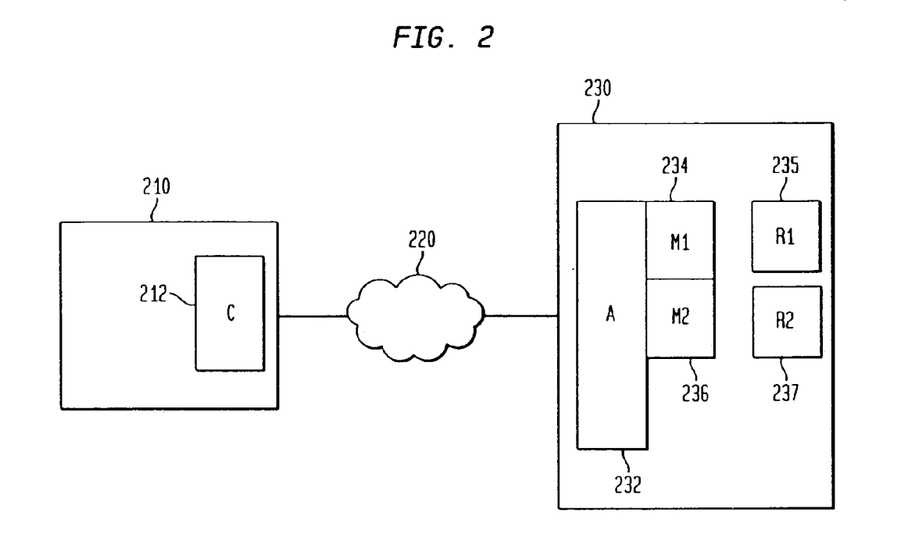
FIG. 2 is a block diagram showing an exemplary architecture for an automated availability system implemented according to embodiments of the invention.

FIG. 2 shows an exemplary architecture for a system implemented according to various embodiments of the invention. The system of FIG. 2 includes a console 212 executing on a device 210. Device 210 may comprise any suitable device, such as a host computer, server or other computing device that has a processor to execute code that implements the console. Console 212 may be implemented in any of various ways, such as with instructions encoded on a computer-readable medium (e.g., a memory or other storage device) accessible to, and executed by, the processor on device 210. Console 212 may, for example, include instructions which define the presentation of a graphical user interface (GUI) to a user of device 210, such that the user may provide one or more commands or other input via the GUI to create, modify and/or delete a resource group in a manner described further below.

Console 212 communicates with an agent 232, which executes on device 230. Agent 232 may be implemented in any of various ways, such as with instructions encoded on a computer-readable medium (e.g., a memory or other storage device) which is accessible to, and executed by, a processor in the device 230. In the examples shown in FIG. 2, agent 232 is installed as software on the same device 230 on which one or more resources 235, 237 may also execute, and can manage (e.g., gather information concerning) those local resources in a manner discussed below. Alternatively, agent 232 may be installed on a device separate from (e.g., in network-based communication with) a node on which a resource resides that is managed by the agent, and in such an embodiment, the device on which the agent is installed can be any computing device capable of executing the agent. Device 230 may comprise any suitable device, such as a server which forms part of cluster 100 (FIG. 1), a storage system or any other device having one or more resources to be monitored.

Communication between console 212 and agent 232 occurs via network 220, which may be implemented via any suitable communications protocol and/or infrastructure, such as a LAN, WAN, the Internet, other network, or a combination thereof. Communication via a network allows the console 212 to execute on a device 210 which is remote from the device 230 on which the agent 232 executes, such that the console can be, for example, in another room, another building, or another city from the agent 232. As such, a user who employs console 212 in one location may be able to configure a resource group that includes resources in another (e.g., remote) location. For example, a user may employ console 212 to issue instructions via network 220 to agent 232 to configure a resource group for monitoring resources 235 and 237, and the agent 232 may execute the instructions to create a resource group for monitoring those resources. For example, in one embodiment, the console 212 provides a graphical user interface (GUI) to enable an administrator to create and/or configure a resource group. The GUI is described in greater detail below.

Unlike conventional systems, wherein an administrator creating a resource group is required to log on to each node on which a resource to be included in the group resides, some embodiments of the invention provide a capability whereby an administrator may configure a resource group without logging onto every node that includes a resource to be included in the group. This can be done in any of numerous ways, as this aspect of the invention is not limited to any particular implementation technique.

Figure 8:
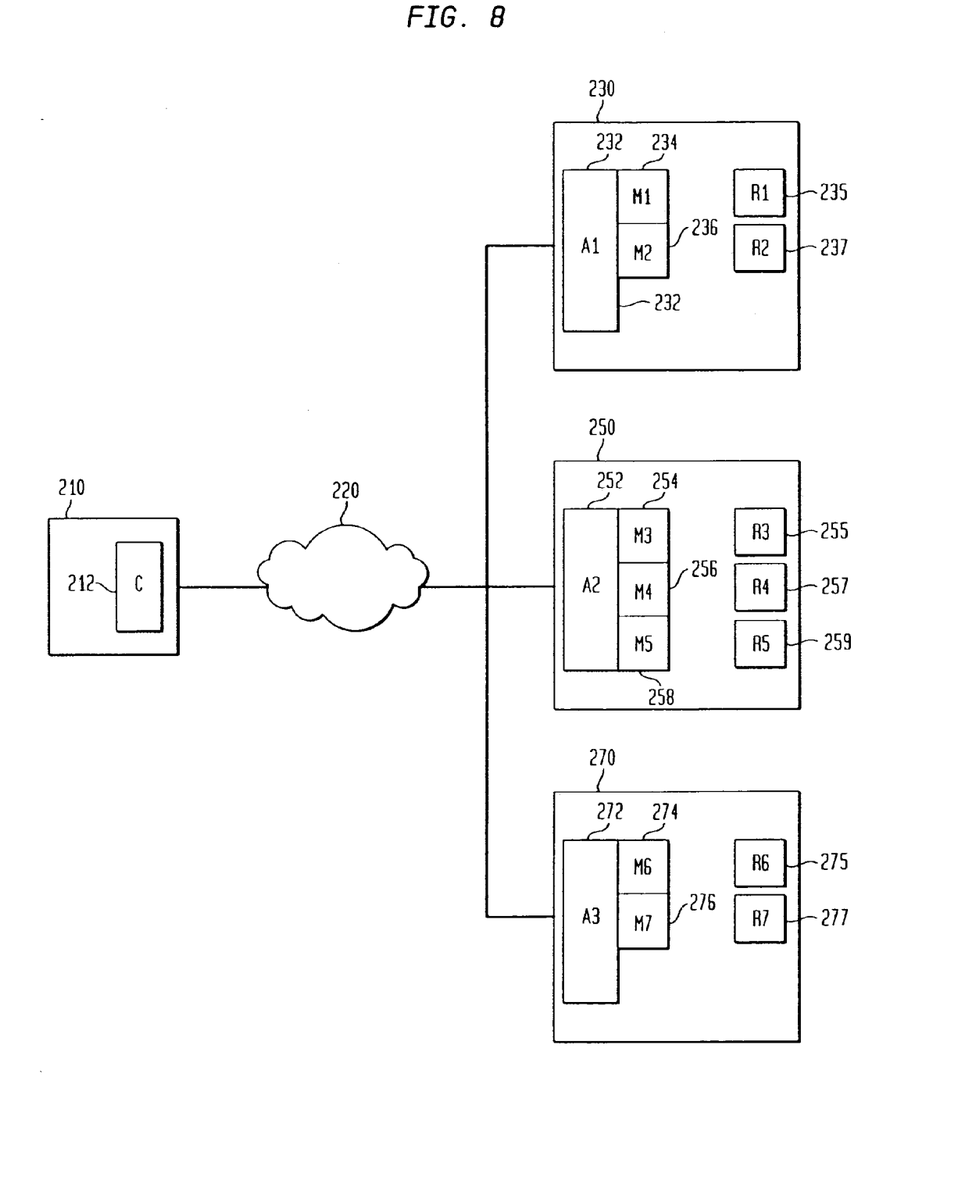
FIG. 8 is a block diagram of a system having an architecture which, allows an administrator to create a resource group without logging on to each node on which resources included in the resource group reside according to one embodiment of the invention.

For example, in one embodiment, an administrator may provide configuration commands to a first agent executing on a first node onto which the administrator has logged in, and the first agent may communicate with one or more other agents executing on other nodes to create a resource group which includes resources on the other node(s). For example, FIG. 8 shows a system representing a variation of the system of FIG. 2, wherein a console 212 communicates via network 220 with agent 232 executing on device (or node) 230. Resources 235 and 237 also reside on device 230. Also included in the system of FIG. 8 are devices 250 and 270, on which agents 252 and 272 reside, respectively. Resources 255, 257 and 259 are installed on device 250, and are resources 275 and 277 are installed on device 270.

An administrator may employ console 212 to issue instructions via network 220 to log into device 230, and to instruct agent 232 to create a resource group for monitoring resources which do not reside on device 230. For example, a user may issue instructions to agent 232 to include resources 257, 259 and resource 275 in the resource group. Upon receiving the instructions, agent 232 on device 230 may communicate via network 220 with agent 252 on device 250 and agent 272 on device 270. For example, agent 232 may communicate information related to resources 257 and 259 with agent 250, and information related to resource 275 with agent 272. In this respect, agent 232 may be considered a lead agent for creating the resource group, and the agents 252 and 272 may be considered subordinate agents which take direction from the lead agent. As a result, an administrator need not log on to each of devices 230, 250 and 270 to create a resource group which includes resources residing on these devices. Thus, the administrator may create a resource group which includes resources on devices that the administrator may not have access privileges to access.

It should be appreciated that the embodiments of the invention described herein that enable a resource group to be configured from a device remote from the one on which AA software is executing, and which do not require an administrator to log on to each node on which a resource to be included in a resource group resides, can be used with the other embodiments of the invention described herein, or can be used separately therefrom. In addition the other aspects of the invention described herein are independent of the remote configuration and login concepts, so that not all embodiments of the invention are limited to use with a system that provides these capabilities.

Although FIG. 2 shows resources 235, 237 residing on the same device 230 as the agent 232, the embodiments of the invention described herein are not limited in this respect, as the agent 232 may facilitate monitoring a resource in any location. For example, an agent may be installed on any of nodes 110 (FIG. 1) as part of the AAM 180 and facilitate monitoring one or more resources on other devices and accessible to the agent via either of networks 155, 165.

For example, an agent executing on device 110A may monitor a resource executing on any of devices 110A-110D or 170A-170F.

In one embodiment of the invention (shown in FIG. 2), the software for creating resource groups if modularized to facilitate ease of programming, so that separate modules can be written to support the formation of resource groups with different types of resources. Modules 234, 236 are accessible to agent 232 on device 230. Modules 234, 236 may be implemented in any of various ways, such as with one or more data structures, parameters, attributes and/or instructions encoded on a computer-readable medium which is accessible to agent 232. In one embodiment, each of modules 234, 236 provides functionality to agent 232 related to configuring a resource group which includes a particular type of resource. For example, modules 234 and 236 may define functionality for creating a resource group including resources 235 and 237, respectively. In one embodiment, the system provides flexibility in creating resource groups for various types of resources. Specifically, while modules 234 and 236 define functionality for creating a resource group including resources 235 and 237, respectively (i.e., modules 234, 236 are specific to particular resources), the agent 212 and console 232 are generic to all resources. This is advantageous in that when it is desired to support the creation of a resource group for a new type of resource, all that need be created is a new module which can then work with the common console and agent.

As discussed above, a resource may include any type of entity which may be monitored or controlled. Thus, different modules may define different approaches for monitoring heterogeneous resources. For example, module 234 may define functionality for configuring a resource group to monitor a database application, and module 236 may define functionality for configuring a resource group to monitor a storage system, or any other type of resource. It should be appreciated that while the modularization techniques described herein are advantageous, not all embodiments of the invention are limited to a modular implementation.

A resource group may define any of numerous functions related to monitoring a resource. For example, in one embodiment, a resource group may define attributes of a resource, a sequence of actions to initialize the resource, and/or a sequence of actions to stop the resource. For example, a resource group for a database application may include a start sequence for the application, which may specify an IP address for the node on which the application executes, one or more storage devices on which data which is to be managed by the database application resides, one or more processes for the database application (e.g., the listener process), and/or a proxy process, which may provide more detail about application functions, such as its transaction rate and/or the load it places on the CPU. The resource group may receive information from the resource during its operation defining whether the resource is running properly. If it is determined that the resource is running improperly, rules defined by the resource group may define actions to be taken in response. For example, if a resource is determined to be running improperly on a first node, the rules provided by the resource group may define that the resource should be shut down on the first node, and initialized on a second node.

In one embodiment, the console 212 implements a GUI to provide an interface to the administrator for configuring and/or monitoring one or more resource groups. When the administrator desires to set up a resource group for a particular resource, the GUI may invoke functionality defined by a module corresponding to the resource. The module may provide instructions and/or parameters to the console, such that the GUI presented by the console requests the information from the administrator used to establish the resource group. As the module can be customized for particular resources, in one embodiment the GUI's produced in conjunction with the module can similarly be customized so that a customized GUI can be used for facilitating creation of one or more resource groups.

The functionality established by modules 234, 236 to implement a resource group may be invoked automatically and/or based on input provided by a user. For example, to establish a resource group to monitor the resource 235, an administrator may employ console 212 to communicate with agent 232, which in turn invokes the module (e.g., module 234) that corresponds to the type of resource to be monitored.

A module provides functionality which may be implemented by the console to receive information from the administrator in order to create a resource group. Specifically, a module may define functionality for receiving certain information from the user which is used, in conjunction with other information defined by the module, to create a resource group to monitor the resource. For example, if the user wants to create a resource group to monitor an Oracle database application, the user may provide an indication via the console (e.g., via a GUI presented by the console) that this is the case, thereby invoking the module which corresponds to the Oracle database application. The module may define functionality defining specific information that should be collected from the user to create the resource group for this type of resource, and the module may also include other information that can be used to create the resource group. For example, the administrator may not need to provide information regarding specific sequences for stopping and starting the Oracle database application, as this information may be defined by the module.

In one embodiment, the module provides a definition file for creating a resource group for a particular resource. Based on information provided by the user, the module may update the definition file to specify functionality related to monitoring the resource. For example, the module may add information to the definition file based on information supplied by the user. The definition file may be utilized by the agent 232 to create the resource group.

In conventional systems, when an administrator wants to create a resource group which includes particular resources, the administrator is required to provide typewritten input to specify the names of the resources. For example, if the administrator wishes to create a resource group to monitor a service that includes one or more databases, the administrator is required to type in the names of the particular databases. As discussed above, this can cause problems when manually entered information is entered improperly. In one embodiment, a process of "specifying" resources and/or characteristics to be included in a resource group may be at least partially automated.

In one embodiment referred to herein as "interactive discovery," the agent may determine one or more candidate resources or characteristics, and present them to an administrator for selection. For example, if an administrator specifies that a particular service that includes several databases should be monitored, functionality defined by a module corresponding to the service may be invoked to determine the databases that are included in the service, so that a list of these databases may be presented to the administrator. The administrator then may select the databases which are to be included in the resource group from the list. This reduces the likelihood that the administrator will make an error in specifying the databases which are to be included in the resource group.

In another embodiment, some aspects of the discovery process can be automated completely, so that one or more resources and/or characteristics may be determined without any administrator input. For example, if an administrator specifies that a database application is to be monitored, the agent may automatically determine the device (e.g., the IP address of a node) on which the database application executes, without requiring any administrator input. Characteristics such as this (i.e., for which only a single option exists, so user selection is not required) may be determined automatically. For example, resources and/or characteristics which may be automatically discovered include (but are not limited to) a NETBIOS or NETBEUI identifier for a node, one or more databases which form part of a service, one or more processes and/or services which execute on a node (e.g., a server), one or more installed applications and/or the configuration parameters associated therewith (e.g., the location or path at which the applications are installed), the storage devices, file systems or volumes which are available to a resource, the configuration of a device (e.g., CPU speed and/or model, the devices which are coupled to a node, and the network interfaces employed by one or more nodes and the settings associated therewith.

Any suitable resources and/or characteristics may be discovered, either interactively or automatically. For example, discovery may be performed to determine the application processes that comprise a service, a path or other location from which a resource executes, the storage device (s) attached to a particular node, a network information card (NIC) for a device, or any other device identifier (e.g., a NETBEUI or NETBIOS identifier). The invention is not limited in this respect, as any suitable resource and/or characteristic may be discovered. Further, in one embodiment, a process which includes discovery of resources and/or characteristics (e.g., a process executed to create a resource group) may include both automatic and interactive discovery. For example, a process performed to create a resource group may include the interactive discovery and selection of a particular resource and the automatic discovery of a characteristic of that resource. Functionality defining whether automatic and/or interactive discovery is performed to determine a particular resource and/or characteristic may be defined in any suitable way. In one embodiment, this functionality is defined by a module for the relevant type of resource.

Although interactive and automatic discovery can be employed together and provide the advantages described herein, it should be appreciated that the invention is not limited to employing these techniques together, as either can be used separately. Also, it should be appreciated that some aspects of the present invention are independent of the discovery process, so that some embodiments need not employ either interactive or automatic discovery.

Figure 3:
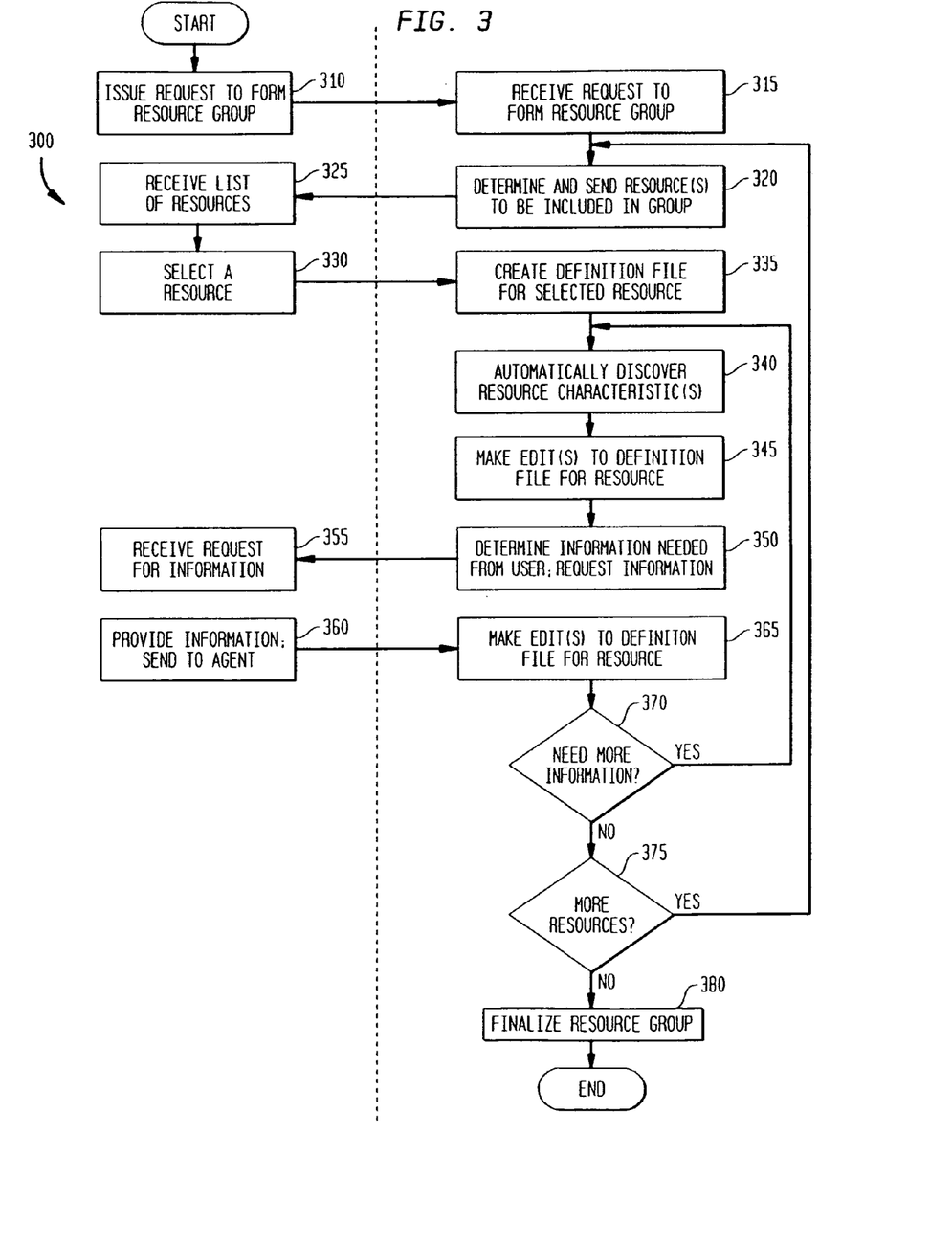
FIG. 3 is a flowchart showing an exemplary process for creating a resource group for monitoring a resource according to embodiments of the invention.

As discussed above, in one embodiment a module may include code which is executed by the agent to create a resource group for monitoring one or more resources. FIG. 3 shows a process 300 for creating a resource group according to functionality defined by a module, wherein one or more characteristics of the resource may be discovered automatically and/or interactively.

The process 300 includes acts (shown on the left-hand side of FIG. 3) performed by a console (e.g., console 212, which may function in part based on input received from a user) and acts (shown on the right-hand side of FIG. 3) performed by an agent (e.g., agent 232), as well as communication passing therebetween. The process 300 includes the selection of one or more resources to be included in a resource group, the determination of characteristics for each selected resource, and updates to a definition file to define resource group.

Initially, the process proceeds to act 310, wherein the console issues a request to the agent to create a resource group. This request may be based, for example, on input provided by a user to a GUI provided by the console, and may be communicated to the agent via a network (e.g., network 220, FIG. 2).

The request is received by the agent at act 315. The agent may access functionality defined by a module which corresponds to the type of resource identified by the request. For example, the agent 232 may invoke functionality provided by module 234 (FIG. 2), which may correspond to resource 235. A logical relationship between a resource and a module may be established when a module is made accessible to the agent (e.g., when a module is installed on the device on which the agent executes). For example, the installation of the module for a type of resource may cause the agent to be configured to automatically retrieve functionality provided by the module when a request is received to create a resource group to monitor that type of resource.

Upon the completion of act 315, the process proceeds to the act 320, wherein the agent generates a list of all of the resource(s) on the device(s) monitored by the agent that fit the profile of the resource identified in the request, and sends the list to the console. The resources included in the list may be identified using any suitable technique. For example, the agent may execute code provided by the module to discover the resources which fit the profile of the resource identified in the request.

The list of resources sent by the agent in act 320 is received at the console in act 325. In one embodiment, the list is presented to the user via a GUI provided by the console.

The process then proceeds to act 330, wherein a user selects one or more resources from the list for inclusion in the resource group, and this indication is sent to the agent. The user may select the resource(s) for inclusion in the resource group in any suitable manner (e.g., via a GUI provided by the console).

The agent receives the selection in act 335, and creates a definition file for the resource group. As discussed above, upon its completion, the definition file may define parameters for creating the resource group, and may be employed by the agent in the execution of a programmed procedure to create the resource group. In one embodiment, the agent may invoke functionality defined by the module that corresponds to the selected resource type to create the definition file for the resource group.

The process then proceeds to the act 340, wherein the agent seeks to automatically discover one or more characteristics of the selected resource that may be capable of automatic discovery. As discussed above, the act 340 may include determining one or more determinative resource characteristics. For example, the agent may automatically discover a path from which a selected resource executes, or the IP address of a node on which a resource resides. Automatic discovery may be performed as many times as is necessary to determine the characteristics of the selected resource that is capable of being automatically discovered. For example, if four separate characteristics of a resource are capable of being automatically determined, in one embodiment the agent will automatically discover all four characteristics in the act 340. Of course, it should be appreciated that the automatic discovery aspect of the present invention is not limited in this respect, as merely a subset of the characteristics capable of automatic discovery may be automatically discovered in act 340.

Upon the completion of the act 340, the process proceeds to the act 345, wherein the agent updates or makes one or more edits to the definition file for the resource group based on the characteristic(s) discovered in the act 340.

The process then proceeds to act 350, wherein the process determines whether any information is desired of the console (e.g., user) to complete the definition file for the resource group, and if so, a request is issued to the console for input to define any such characteristics. For example, as discussed above, the agent may create and send a list from which the user may select to define desired characteristics. For example, the agent may identify a list of storage devices which could store data for a selected database application resource, and send the list to the console, such that the user may select the appropriate device(s). Although not shown in FIG. 3, if it is determined in act 350 that no additional information is needed from the user for the specified resource, the process proceeds to act 375.

The request sent by the agent in act 350 is received at the console in act 355. Much in the manner discussed above in connection with act 325, the console may request the desired information from the user in any suitable way (e.g., using a GUI to present a list of selection options to the user).

In act 360, the console (e.g., through a user) selects from the information provided by the agent, to define the characteristics for the selected resource, and sends the selected information back to the agent. It should be appreciated that rather than providing a list to the user to choose from in act 360, other techniques can be employed for obtaining information from the user (e.g., having the user type in information), as the present invention is not limited in this respect.

In act 365, the agent receives the information transmitted in act 360, and updates the definition file which was created for the resource group in act 335 based on the received information.

Upon the completion of act 365, the process proceeds to act 370, wherein a determination is made as to whether more information is needed to define the resource group for the selected resource. When it is determined in the act 370 that more information is required, the process returns to the act 340. Thus, acts 340-365 may be repeated as many times as needed until it is determined at act 370 that all of the information needed to define the resource group for the selected resource has been obtained.

When it is determined in act 370 that no more information is required to define the resource, the process proceeds to act 375, wherein the agent makes a determination as to whether there are more resources to be included in the resource group to be processed. This can be done in any suitable way. For example, while not shown in FIG. 3, the user may be queried to determine whether additional resources should be added to the resource group. When it is determined that there are more resources to be included in the resource group, the process returns to the act 320. Thus, acts 320-365 repeated for each resource until it is determined that all of the relevant information for all of the resources in the group have been obtained and inserted into the definition file.

At that point, the process proceeds to the act 380, wherein the resource group is finalized, and the process terminates.

In one embodiment, the agent may finalize the resource group by completing the definition file for the resource group, and utilizing the definition file in a programmed procedure which creates the resource group.

As discussed above, in one embodiment, the agent stores information regarding the actions taken to create the resource group, such that the entities which collectively represent the resource group may later be identified so that they may be modified and/or deleted, if desired.

In the embodiment described above in connection with FIG. 3, a resource group is defined by a definition file. However, it should be appreciated that the present invention is not limited in this respect, as a resource group may be defined in any suitable manner.

Similarly, it should be appreciated that the specific process shown in FIG. 3 is merely one process that may be used to implement aspects of the present invention, as numerous alternative implementations are possible.

A resource group created in accordance with embodiments of the invention may define any attribute related to monitoring and/or controlling a resource. For example, a resource group established to monitor a database application may specify stop and start sequences for the application as well as devices on which the application is installed, such that if the application begins to behave anomalously on one device, the system can shut down the application on the first device and start the application on another device so as to continue the availability of the application to an end user. A resource group may also define specific actions to be taken to inform a user that an event affecting a monitored resource has occurred. For example, a resource group may provide for informing an administrator via email that a database application has reached a threshold application rate.

As discussed above, in one embodiment, a validation process is performed during the creation of a new resource group, such that the creation of an invalid resource group is prevented. In one embodiment, validation may be performed as each resource and/or characteristic included in the resource group is specified by a user, as shown in the process 400 depicted in FIG. 4.

Figure 4:
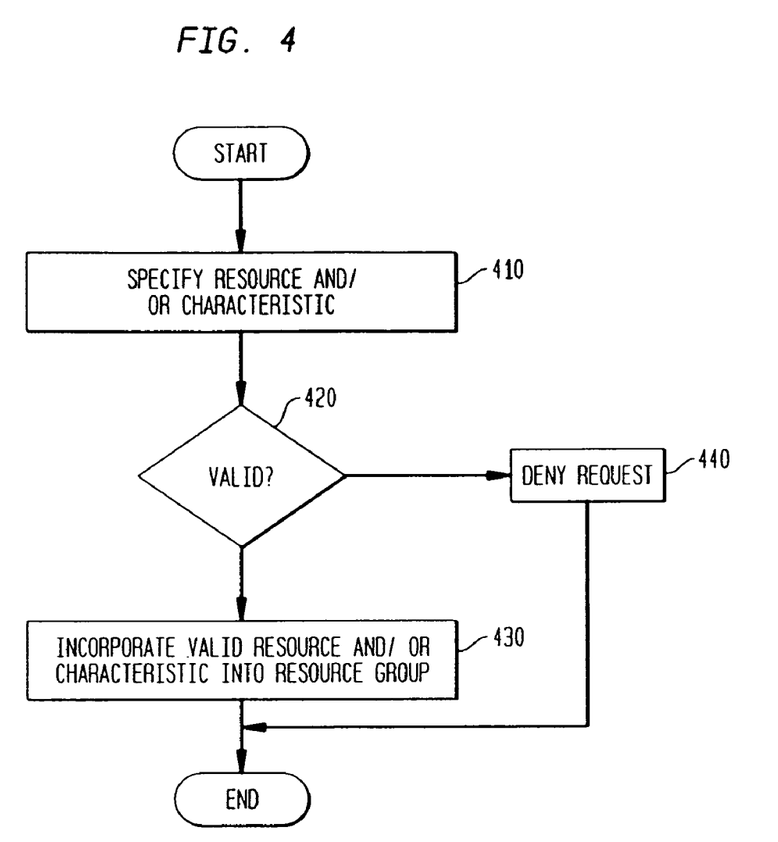
FIG. 4 is a flowchart showing an exemplary process for validating a resource or characteristic to be included in a resource group according to one embodiment of the invention.

The process of FIG. 4 begins in act 410 when a user specifies a resource or characteristic. A user may specify a resource or characteristic by providing input to a GUI presented by console 212 (FIG. 2), or in any other suitable manner.

The process then proceeds to act 420, wherein a determination is made as to whether the resource or characteristic specified by the user is valid. This may be done in any suitable fashion, as the invention is not limited in this respect. As described above, in one embodiment, discovery may assist with validating a resource or characteristic, such as by determining the resource or characteristic automatically (i.e., as with automatic discovery) so that the validity of the resource or characteristic is ensured, or by presenting only valid resources or characteristics to a user for selection (i.e., as with interactive discovery). However, the invention is not limited to validating resource characteristics via discovery, as validation may occur in any suitable fashion.

When it is determined that the resource or characteristic specified in act 420 is valid, the process proceeds to act 430, wherein the validated resource or characteristic is incorporated into a resource group in any suitable manner, including through the use of the process of FIG. 3. When it is determined in act 420 that the resource or characteristic is not valid, the process proceeds to act 440, wherein the request is denied. In one embodiment, the denial may include providing feedback to the user of the denial.

As mentioned above, when the above-described interactive and/or automatic discovery techniques are employed, the user's selections are self-validating, as the user is only presented with valid selection choices.

As discussed above, in accordance with one embodiment of the invention, a previously defined resource group may be modified or deleted. This can be done in any of numerous ways. For example, modification or deletion of a resource group may occur based on input provided by the user, as shown by the process 500 depicted in FIG. 5.

Figure 5:
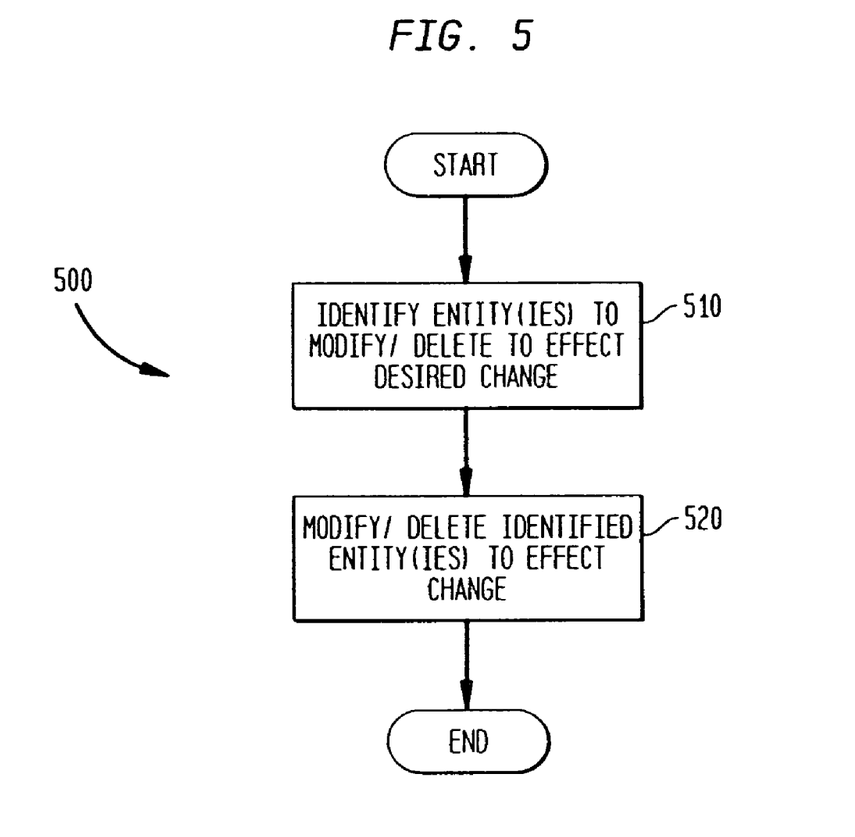
FIG. 5 is a flowchart showing an exemplary process for modifying or deleting a resource group according to one embodiment of the invention.

Initially, in act 510, one or more entities in the resource group are identified to be modified or deleted. This can be done, for example, based upon input from a user.

The process then proceeds to act 520, wherein the identified entities are modified or deleted. This may occur in any suitable manner. For example, in one embodiment, when a resource group is created, information can be stored in a manner which logically relates the information that defines and/or implements a resource group. The information can be stored and modified in any suitable way. For example, the information can be stored in a data structure, and a user may employ a text editor to make the desired change.

In an alternate embodiment, modification of a resource group may be performed as a result of a variation of the discovery processes described above. Specifically, the system may be configured to automatically discover, without prompting from a user, when a resource and/or characteristic which is reflected in a resource group has changed so that the resource group may be updated. For example, the system may be configured to examine one or more monitored resources upon the occurrence of an event (such as the startup of the agent, or any other suitable event). As an example, the system may be configured to discover that a new database has been added to a monitored service. The system may be configured to automatically modify a resource group to accommodate the changed resource or characteristic, ask a user whether the resource group should be modified to accommodate the changed resource or characteristic, or respond in any other fashion.

Figure 6:
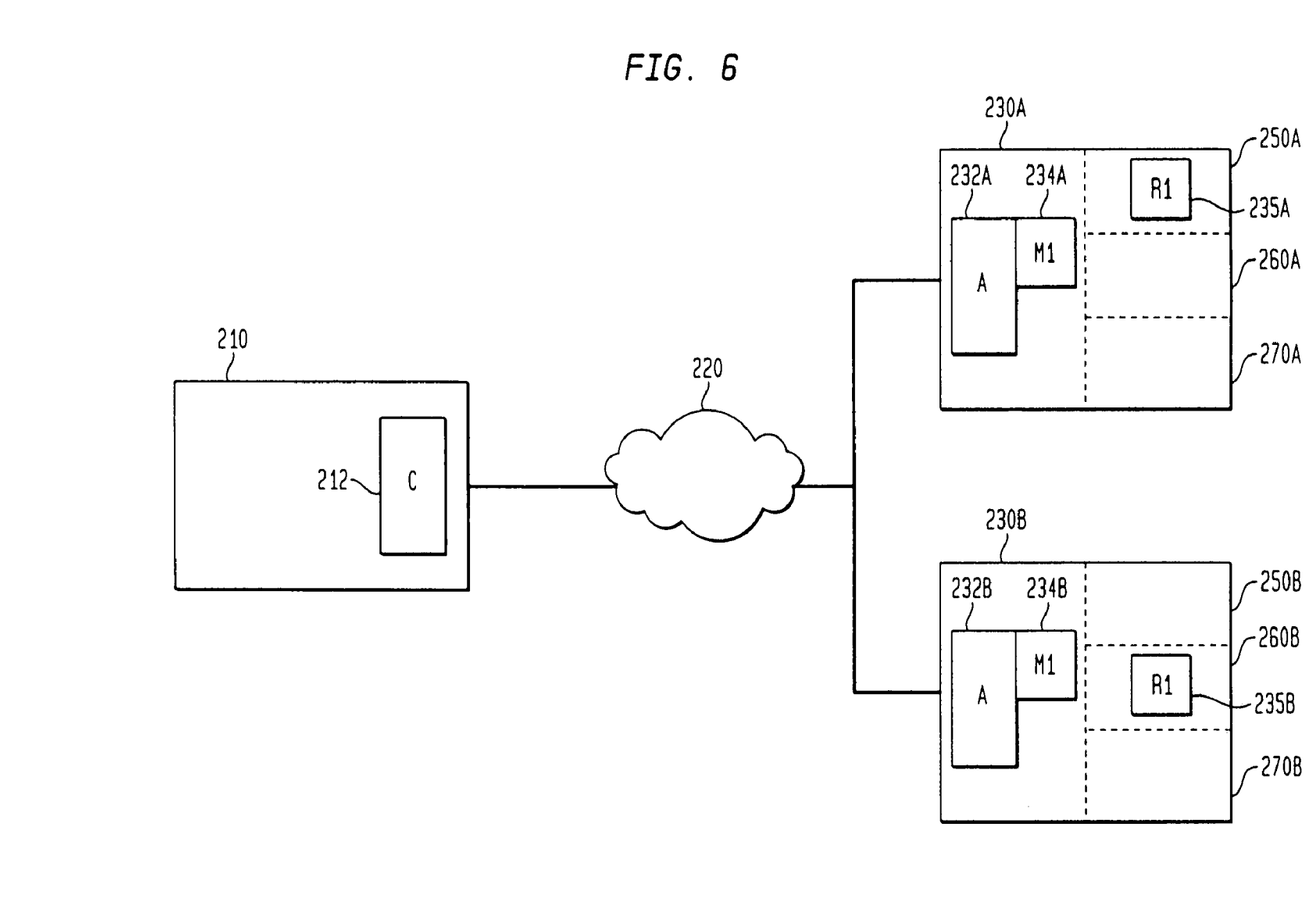
FIG. 6 is a block diagram of a system having two instances of a particular type of resource that are installed at different locations on different computers and which may be reflected in a same resource group in accordance with one embodiment of the invention.

As discussed above, one embodiment supports the creation of a resource group in which multiple instances of a particular type of a resource can be installed and configured differently on two or more devices. For example, a database application may be installed at different paths on each device. An example of such a system is shown in FIG. 6, which is similar in many respects to FIG. 2. However, the device 230 shown in FIG. 2, and components resident thereon, have been replaced by components having the same reference numerals as those shown in FIG. 2, but with a suffix of A or B. Thus, device 230 is replaced by devices 230A and 230B, agent 232 is replaced by agents 232A and 232B, module 234 is replaced by modules 234A and 234B, and so on. Most notably, resource 235 in FIG. 2 is replaced by resource instances 235A and 235B in FIG. 6. Resource instances 235A-235B are representations of resource 235 on devices 230A and 230B, respectively.

Agents 232A and 232B have been installed on devices 230A and 230B, respectively, and each is in communication via network 220 with console 212. In addition, modules 234A and 234B have been installed on devices 230A and 230B and are accessible to agents 232A and 232B, respectively. On each of devices 230A and 230B are locations 250, 260, and 270. On device 230A, resource 235A resides in location 250A, while on device 230B, resource 235B resides in location 260B.

A resource group may be created for the system of FIG. 6, which includes resource instances 235A and 235B residing in locations 250A and 260B, respectively. Such a resource group may be created, for example, using the process 300, described above with reference to FIG. 3, or in any other suitable way. For example, the automatic and/or interactive discovery processes performed as part of process 300 may determine that resource instance 235A is located in location 250A and that resource instance 235B is located in location 260B, such that a definition file created for a resource group that includes resource instances 235A-235B provides for the different configurations (e.g., locations) of the resource on each device. In one embodiment, the definition file may be employed by the agent (e.g., either of agents 232A or 232B) to create a resource group which includes parameters for the resource which are specific to each device. For example, the resource group may include a first set of parameters (e.g., provided in a first data structure) which define the configuration of the resource (e.g., resource instance 235A) on a first device (e.g., device 230A), and a second set of parameters (e.g., provided in a second data structure) which define the configuration of the resource (e.g., resource instance 235B) on the second device (e.g., device 230B).

In one embodiment, a resource group may be defined by a set of parameters which define node-specific aspects of the resource group (which can vary from node to node), as well as parameters which define node-independent aspects of the resource group. For example, a resource group for a database application may include one or more sets of device-specific parameters such as the path at which the application is installed and/or the IP address of the device, and a set of device-independent parameters such as the names of the listener and proxy processes for the application.

It should be appreciated that the embodiment of the invention that enables differently configured instances of a resource to be monitored in a same resource group provides flexibility, so that, for example, administrators need not install an application at the same path location on different devices.

In another embodiment of the invention, the console presents a GUI having one or more display portions that each corresponds to a module accessible to the agent for creating a resource group for a certain type of resource. In one embodiment, newly installed modules are automatically discovered, so that the GUI can be updated to recognize the newly installed module. This can be done in any of numerous ways. In one embodiment, the agent may, for example, detect the installation of one or more new modules, and inform the console that the new modules are present. Based on this information, the console may cause the GUI to be modified to accommodate the new module(s).

Figure 7:
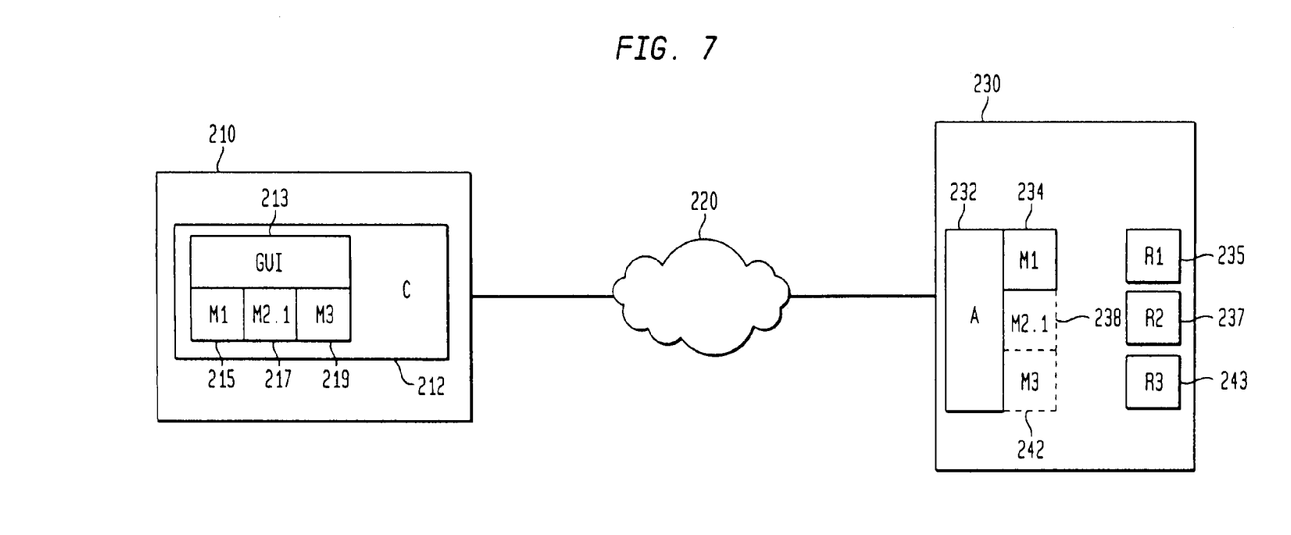
FIG. 7 is a block diagram showing an exemplary system which includes a graphical user interface (GUI) having a display which is customized based on resources which are monitored on the system.

FIG. 7 shows an exemplary system configuration for presenting a GUI which is customized according to the collection of modules installed on the system. FIG. 7 also represents a variation on the configuration of FIG. 2, wherein both a new module and an updated version of a previously installed module have been installed on the device 230. Specifically, module 238 has been installed on the device 230 to replace an earlier version of the same module (i.e., module 236), and module 242 has been added to the device 230. The system of FIG. 7 also includes a GUI 213 which is presented by console 212. GUI 213 includes display portions 215, 217 and 219, which each may display information related to a specific resource group. For example, display portions 215, 217 and 219 may each display information related to creating a resource group for a specific type of resource. Display portions 215, 217 and 219 may take any suitable graphical form, such as a panel or tabbed display.

Upon the installation of modules 238 and 242, their presence may be determined by agent 232 upon the occurrence of an event, such as the initialization of agent 232. The presence of modules 238 and 242 may be communicated to console 212. For example, the system may be configured such that initialization of console 212 may include an act of querying agent 232 to determine whether a new module or module version has been installed.

New modules 238 and 242 may each specify instructions and/or parameters to other system components, such as GUI 213. Specifically, modules 238 and 242 may specify instructions to GUI 213 to include display portions 217 and 219, such that display portion 217 presents information defined by module 238 and display portion 219 presents information defined by module 242. The instructions and/or parameters specified by new modules 238 and 242 may be in addition to instructions and/or parameters provided by module 234 to GUI 213 for display portion 215, such that display portion 215 presents information defined by module 234.

As should be appreciated from the foregoing, according to one embodiment of the invention, the GUI 213 presented to the user for creation of a resource group may not be the same on all systems, and may be customized depending on the modules installed on the system. The customized GUI can differ for the different resource groups supported thereby (e.g., the customized GUIs can differ in the information they request from the user when configuring different types of resource groups).

In one embodiment, each of display portions 215, 217 and 219 may enable a user to provide an indication that a resource group should be created for a particular type of resource. For example, in one embodiment, a user may supply a command via display portion 215 to create a resource group for resource 235, and the command may be communicated to agent 232, which may access functionality defined by the module corresponding to the resource (i.e., module 234). The functionality provided by module 234 may include instructions to GUI 213 to modify display portion 215, such as to gather information from the user related to the creation of the resource group. For example, module 234 may provide instructions to GUI 213 to present a "wizard" interface to the user which allows the user to specify configuration parameters for the resource group. For example, the wizard interface may present a list of resource characteristics determined through an interactive discovery process like that described above with reference to FIG. 3, such that the user may select from the list to define the configuration parameters included in the resource group.

In another embodiment, GUI 213 may present information related to monitoring one or more resource groups which have already been created. This monitoring GUI may be the same GUI or different from the creation GUI described above, as the invention is not limited in this respect. For example, GUI 213 may present information related to monitoring a resource group which includes a database application, such as the application's transaction rate and/or the load it places on the CPU. Information related to monitoring a resource group may be presented in any suitable fashion. For example, in one embodiment, GUI 213 may include one or more separate display portions (not shown in FIG. 7), such as panels, which each may present information related to monitoring a particular resource group. For example, if two resource groups exist to monitor two separate Oracle databases, the GUI 213 may present separate panels that each shows information related to monitoring one of the databases. In addition, each panel may show information which is specific to its corresponding database, such that, for example, the first panel may show information related to a process which is executed only by the first database, and the second panel may show information related to a process which is executed only by the second database.

According to one embodiment of the invention, the GUI 213 which is presented to a user for monitoring a resource group may not be the same on all systems, and may be customized depending on the modules installed on the system. For example, if a first resource group has been created to monitor an Oracle database and a second resource group has been created to monitor a SQL database, the GUI 213 may present a first display portion showing information related to monitoring the Oracle database and a second display portion showing information related to monitoring the SQL database. For example, the first display portion may display information related to Oracle-specific processes, and the second display portion may display information related to SQL-specific processes.

In one embodiment, each display portion presents summary-level information for a resource group, and also allows a user to request further information related to the resource group. For example, a first panel showing summary-level information for a database application may present the application's current transaction rate, and may enable a user to request information (e.g., presented in another panel) such as changes in the application's transaction rate over time.

As should be appreciated from the foregoing, there are numerous aspects of the present invention described herein that can be used independently of one another. However, it should also be appreciated that in some embodiments, all of the above-described features can be used together, or any combination or subset of the features described above can also be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium (or multiple computer-readable media) (e.g., a computer memory, one or more floppy disks, compact disks, optical disks, magnetic tapes, etc.) encoded with one or more programs that, when executed on one or more computers or other processors, perform methods that implement the various embodiments of the invention discussed above. The computer-readable medium or media can be transportable, such the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways. In particular, various aspects of the present invention may be implemented in connection with any type of network, cluster or configuration. No limitations are placed on the network implementation. Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed is:

1. In a computer system comprising a plurality of resources, an automatic availability manager for monitoring at least some of the plurality of resources, and an agent to configure resource groups, each resource group specifying a group of resources to be monitored by the automatic availability manager and at least one action to be taken by the automatic availability manager upon a determination that at least one of the group of resources has failed or is functioning improperly, a method comprising:
(A) receiving a request from a requestor, at the agent, to configure at least one requested resource group, the request defining at least one characteristic of the at least one requested resource group;
(B) determining whether the at least one characteristic of the at least one requested resource group is valid; and
(C) when it is determined in (B) that the at least one characteristic is not valid, communicating with the requestor to inform the requestor that the at least one requested resource group is not valid.

2. The method of claim 1, wherein the determining in (B) is performed automatically in response to receiving the request.

3. The method of claim 1, wherein (A) and (B) are performed by the agent.

4. The method of claim 1, wherein (B) comprises determining whether all characteristics of the at least one requested resource group are valid.

5. The method of claim 1, further comprising, when it is determined in (B) that the at least one characteristic is valid, configuring the at least one requested resource group.

6. The method of claim 1, further comprising, when it is determined in (B) that the at least one characteristic is not valid, denying the request to configure the at least one requested resource group.

7. The method of claim 1, wherein the agent comprises part of the automatic availability manager.

8. In a computer system comprising a plurality of resources, an automatic availability manager for monitoring at least some of the plurality of resources, and an agent to configure resource groups, each resource group specifying a group of resources to be monitored by the automatic availability manager and at least one action to be taken by the automatic availability manager upon a determination that at least one of the group of resources has failed or is functioning improperly, a method comprising:
(A) receiving a request from a requestor, at the agent, to configure at least one requested resource group the request defining at least one characteristic of the at least one requested resource group;
(B) ensuring the validity of the at least one characteristic of the at least one requested resource group; and
(C) configuring the at least one requested resource group.

9. The method of claim 8, wherein the ensuring in (B) is performed automatically in response to receiving the request.

10. The method of claim 8, wherein (A), (B) and (C) are performed by the agent.

11. The method of claim 8, wherein (B) comprises determining whether all characteristics of the at least one requested resource group are valid.

12. The method of claim 8, wherein (B) comprises:
discovering from the computer system options for selection by the requestor in configuring the at least one requested resource group and constraining the requestor to the discovered options so that the requestor is precluded from defining an invalid resource group.

13. The method of claim 8, wherein the agent comprises part of the automatic availability manager.

14. A computer-readable medium having instructions recorded thereon, which instructions, when executed in a computer system comprising a plurality of resources, an automatic availability manager for monitoring at least some of the plurality of resources, and an agent to configure resource groups, each resource group specifying a group of resources to be monitored by the automatic availability manager and at least one action to be taken by the automatic availability manager upon a determination that at least one of the group of resources has failed or is functioning improperly, perform a method comprising:
(A) receiving a request from a requestor, at the agent, to configure at least one requested resource group, the request defining at least one characteristic of the at least one requested resource group; and
(B) determining whether the at least one characteristic of the at least one requested resource group is valid.

15. The computer-readable medium of claim 14, wherein the determining in (B) is performed automatically in response to receiving the request.

16. The computer-readable medium of claim 14, wherein (A) and (B) are performed by the agent.

17. The computer-readable medium of claim 14, wherein (B) comprises determining whether all characteristics of the at least one requested resource group are valid.

18. The computer-readable medium of claim 14, further comprising, when it is determined in (B) that the at least one characteristic is valid, configuring the at least one requested resource group.

19. The computer-readable medium of claim 14, further comprising, when it is determined in (B) that the at least one characteristic is not valid, communicating with the requestor to inform the requestor that the at least one requested resource group is not valid.

20. The computer-readable medium of claim 14, further comprising, when it is determined in (B) that the at least one characteristic is not valid, denying the request to configure the at least one requested resource group.

21. The computer-readable medium of claim 14, wherein the agent comprises part of the automatic availability manager.

22. A computer-readable medium having instructions recorded thereon, which instructions, when executed in a computer system comprising a plurality of resources, an automatic availability manager for monitoring at least some of the plurality of resources, and an agent to configure resource groups, each resource group specifying a group of resources to be monitored by the automatic availability manager and at least one action to be taken by the automatic availability manager upon a determination that at least one of the group of resources has failed or is functioning improperly, a method comprising:
(A) receiving a request from a requestor, at the agent, to configure at least one requested resource group, the request defining at least one characteristic of the at least one requested resource group;
(B) ensuring the validity of the at least one characteristic of the at least one requested resource group; and
(C) configuring the at least one requested resource group.

23. The computer-readable medium of claim 22, wherein the ensuring in (B) is performed automatically in response to receiving the request.

24. The computer-readable medium of claim 22, wherein (A), (B) and (C) are performed by the agent.

25. The computer-readable medium of claim 22, wherein (B) comprises determining whether all characteristics of the at least one requested resource group are valid.

26. The computer-readable medium of claim 22, wherein (B) comprises:
discovering from the computer system options for selection by the requestor in configuring the at least one requested resource group and constraining the requestor to the discovered options so that the requestor is precluded from defining an invalid resource group.

27. The computer-readable medium of claim 22, wherein the agent comprises part of the automatic availability manager.

28. An apparatus for use in a computer system comprising a plurality of resources, an automatic availability manager for monitoring at least some of the plurality of resources, and an agent to configure resource groups, each resource group specifying a group of resources to be monitored by the automatic availability manager and at least one action to be taken by the automatic availability manager upon a determination that at least one of the group of resources has failed or is functioning improperly, the apparatus comprising:
a receipt controller that receives a request from a requestor to configure at least one requested resource group, the request defining at least one characteristic of the at least one requested resource group; and
a determination controller that determines whether the at least one characteristic of the at least one requested resource group is valid.

29. The apparatus of claim 28, wherein the determination controller determines whether at least one characteristic of the at least one requested resource group is valid automatically in response to the receipt controller receiving the request.

30. The apparatus of claim 28, wherein the receipt controller and the determination controller are implemented by the agent.

31. The apparatus of claim 28, wherein the determination controller further determines whether all characteristics of the at least one requested resource group are valid.

32. The apparatus of claim 28, further comprising:
a configuration controller that, when it is determined by the determination controller that the at least one characteristic is valid, configuring the at least one requested resource group.

33. The apparatus of claim 28, further comprising a communication controller that, when the determination controller determines that the at least one characteristic is not valid, communicates with the requestor to inform the requestor that the at least one requested resource group is not valid.

34. The apparatus of claim 28, further comprising a request denial controller that, when the determination controller determines that the at least one characteristic is not valid, denies the request to configure the at least one requested resource group.

35. An apparatus for use in a computer system comprising a plurality of resources, an automatic availability manager for monitoring at least some of the plurality of resources, and an agent to configure resource groups, each resource group specifying a group of resources to be monitored by the automatic availability manager and at least one action to be taken by the automatic availability manager upon a determination that at least one of the group of resources has failed or is functioning improperly, the apparatus comprising:
a receipt controller that receives a request from a requestor to configure at least one requested resource group the request defining at least one characteristic of the at least one requested resource group;
a validity controller that ensures the validity of the at least one characteristic of the at least one requested resource group; and
a configuration controller that configures the at least one requested resource group.

36. The apparatus of claim 35, wherein the validity controller ensures the validity of the at least one characteristic of the at least one requested resource group automatically in response to the receipt controller receiving the request.

37. The apparatus of claim 35, wherein the receipt controller, validity controller and configuration controller are implemented by the agent.

38. The apparatus of claim 35, wherein the validity controller further determines whether all characteristics of the at least one requested resource group are valid.

39. The apparatus of claim 35, wherein the validity controller further discovers from the computer system options for selection by the requestor in configuring the at least one requested resource group and constrains the requestor to the discovered options so that the requestor is precluded from defining an invalid resource group.

* * * * *